July 31, 1962     N. F. PRATT     3,046,781
MAGNETOSTRICTIVE TORQUE METER
Filed Sept. 21, 1959
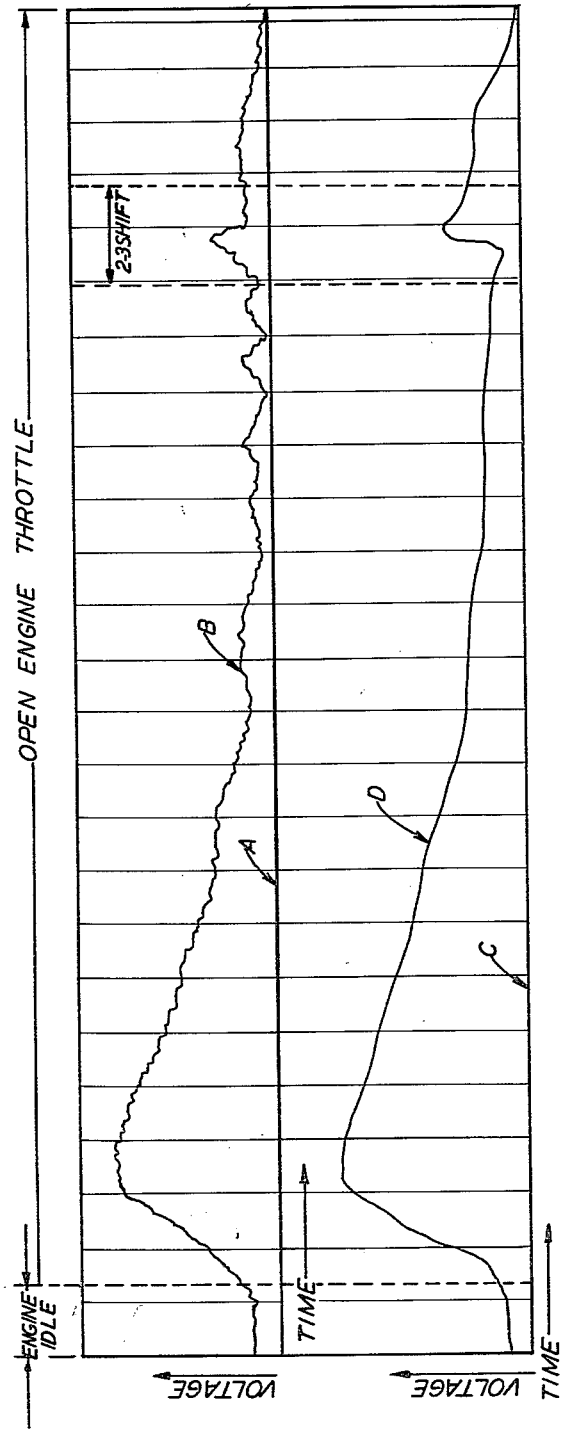
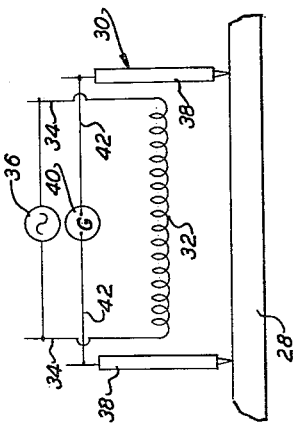
FIG. 2
FIG. 3
FIG. 1
NORMAN F. PRATT
INVENTOR.
BY John R. Faulkner
Donald J. Harrington
ATTORNEYS

3,046,781
MAGNETOSTRICTIVE TORQUE METER
Norman F. Pratt, Ypsilanti, Mich., assignor to Ford Motor Company, Dearborn, Mich., a corporation of Delaware
Filed Sept. 21, 1959, Ser. No. 841,146
3 Claims. (Cl. 73—136)

My invention relates generally to stress measuring instruments and, more particularly, to a torque meter that employs a magnetostriction principle.

The phenomenon of magnetostriction is well known in the art of precision instruments and its becomes apparent when an electromagnetic flux field is placed in the vicinity of a steel shaft or other body exhibiting magnetic properties. The flux field is usually formed by means of electrical windings which are excited by an alternating current source. The body in the flux field will exhibit a measurable degree of strain when the electrical windings are excited by reason of the magnetostrictive effects. Conversely, when such a body so positioned in the magnetic field is subjected to stress, the magnetic properties of the body change, and this in turn has an influence on the magnetic flux field.

In the torque meter of my instant invention I have utilized this principle by providing an electrical coil capable of establishing a magnetic flux field in the vicinity of a member having magnetic properties and which is stressed. This member forms a portion of a so-called secondary winding which coacts with the primary windings of the coil, and the induced voltage in this secondary winding may be measured by means of a suitable galvanometer. The stresses induced in the member by the applied torque will therefore affect the voltage reading obtained by the galvanometer, and when the latter is suitably calibrated, the voltage reading will provide an indication of the torque applied to the member.

The improved torque meter of my invention is particularly adapted to be used to measure the torque applied to an internally disposed turbine shaft in a hydrokinetic torque converter power transmission mechanism under actual operating conditions. Such transmission mechanisms usually include hydrokinetic pump and turbine members and a stator or reactor member situated between the turbine member exit section and the pump member inlet section. The reactor is carried by a stationary reactor sleeve shaft, and the turbine output shaft is rotatably journaled within the reactor shaft. The turbine shaft in turn is connected to the power delivery gears of the transmission which form a power delivery path to a power output shaft.

The primary windings of the torque meter of my invention may be disposed about the reactor shaft and suitable leads may be extended from this winding to a suitable external location to permit excitation. The turbine shaft is journaled within a bushing at a location adjacent the hub of the turbine member, and one lead of the secondary winding of my torque meter may be electrically connected to this bushing, the latter therefore functioning as a slip ring for the rotatable turbine shaft. One terminal of a galvanometer circuit may be connected to the lead extending from the turbine shaft bushing and the other terminal thereof may be grounded to the transmission case. The power output end of the turbine shaft is similarly grounded to the transmission casing through a power delivery gear element and the associated clutch and brake structure, and the secondary circuit is thus completed.

When the turbine shaft is subject to torque, the magnetic properties are affected as above mentioned, and changes in torque may then be measured on the galvanometer. When suitably calibrated, my torque meter will provide an accurate interpretation of the torque delivered by the torque converter under actual driving conditions. Such direct readings have heretofore been difficult to obtain and only expensive and elaborate equipment, such as strain gage torque meters, could be used to obtain dependable results.

The meter of my instant invention is capable of obtaining equally dependable readings although its cost is only a small fraction of the cost of conventional strain gage equipment. Also, my improved torque meter may be much more easily operated and the space required to accommodate it is minimal compared to the space requirements of conventional commercial equipment of this type.

The provision of a torque meter of the type described being a principal object of my invention, it is another object of my invention to provide a simplified torque meter capable of readily indicating the torque applied to torque delivery shafts which are situated internally within enclosed power transmitting mechanisms.

It is another object of my invention to provide a torque meter of the type above set forth which is comprised of conventional components and which is relatively easy to operate and capable of providing accurate indications of stress.

It is another object of my invention to provide a torque meter capable of accurately measuring the torque which is transmitted through a rotating shaft while the shaft is rotating.

For the purpose of particularly describing the improved torque meter of my instant invention, reference will be made to the accompanying drawings wherein:

FIGURE 1 is a schematic diagram of the electrical circuitry of the torque meter of my instant invention;

FIGURE 2 is a diagrammatic view showing a modified form of my invention; and

FIGURE 3 is a graphical representation of a typical signal which may be obtained by means of my improved torque meter when it is adapted to measure the torque of an internally disposed turbine shaft of an automotive type multiple speed automatic power transmitting mechanism.

Referring first to FIGURE 1, numeral 10 designates a rotatable shaft to which torque may be applied. The shaft 10 may be journaled in a bearing support by a bearing or a bushing 12. As indicated, shaft 10 is grounded at 14. Electrical windings are shown at 16 and they form a primary coil for the torque meter. As indicated, the windings 16 surround shaft 10 which acts as a portion of a coil. Windings 16 may be excited by an alternating voltage from a source generally designated by numeral 18, the terminals for the leads of the coil 16 being shown at 20.

An electrical lead 22 is electrically connected to bushing 12 and it extends therefrom to a ground connection 24. A galvanometer generally designated by numeral 26 is situated in lead 22. An amplifier "A" may be used with the galvanometer to receive the input voltage signal.

I have thus provided a transformer wherein the primary coil comprises multiple turns about shaft 10 and wherein a single turn secondary coil is situated at a 90° angle with respect to the primary, the shaft 10 forming a part of the secondary winding. For the purpose of understanding the theory of operation, the following tabulation is made of the symbols used in the derivation of the torque equation appearing below:

Φ—Flux (Maxwell)
H—Orsted
N—Number of Turns
I—Current $n$—Turns Per Cm.
$\nu$—Magnetic Permeability
V a.c.—Applied Voltage A.C.
$f$—Frequency of Applied Voltage
$\rho$—Resistivity
$l_1$—Length of Coil (Cm.)
$l_2$—Length or Path (Cm.)
$l_3$—Length of Wire (Cm.)
$K_1$—Magnetostriction Constant
A—Area of Shaft Cm²
V$m$—Output Signal The flux intensity measured in Maxwell's may be obtained in the following fashion:

(1) $n = N/l_1$   (2) $I = V\text{a.c.}/\rho l_3$
(3) $H = 0.4\pi n I$   (4) $\Phi = \nu H A$ The following expression for torque may be then obtained:

$$T = V \ldots A K_2 / K_1 l_2 \Phi$$

When my improved torque meter is used to measure the torque of the turbine shaft for power transmitting mechanisms of the hydrokinetic torque converter type, the windings 16 may be supported by the reactor shaft in surrounding relationship with respect to the turbine shaft and the lead 22 may be directly connected to the bushing for the turbine member which rotatably journals the turbine member and one end of the turbine shaft. The other end of the lead 22 may be grounded to the transmission casing so that lead 22 and shaft 10 have a common ground connection. Although it would appear that shaft 10 forms a direct short circuit for the galvanometer 26, the secondary winding does nevertheless establish an induced voltage which is measured by the galvanometer 26 and which is influenced by changes in the magnetic properties of shaft 10 as it is subjected to torque of varying magnitude. By preference, the voltage source 18 provides 110 A.C. volts. Also by preference, the voltage induced in lead 22 may be suitably amplified, for example, by a transistorized amplifier circuit. Torque readings may be obtained under actual operating conditions and the stresses on the various transmission components may be evaluated under actual driving conditions at any instant.

In FIGURE 2 I have shown a modified form of my invention wherein stresses in a member 28, such as a bar or the like, may be measured by means of an externally situated meter assembly generally identified by numeral 30. Assembly 30 comprises primary windings 32 and an A.C. voltage is applied to each of the terminals 34 of winding 32 by an A.C. voltage source 36. A pair of electrical probes 38 may be used for contacting member 28 and a galvanometer circuit 40 may be situated across the probes 38 as indicated for the purpose of measuring the induced voltage in the secondary winding established by the probes 38, and the member 28 and the galvanometer leads shown at 42. The member 28 is situated within a magnetic flux field established by windings 32, and when the assembly is calibrated an appropriate stress reading may be obtained from galvanometer circuit 40.

I have shown in FIGURE 3 a graphical representation of the signal which may be obtained by the circuit of FIGURE 1 when it is applied to an automatic power transmission mechanism for measuring the actual turbine torque delivered by a hydrokinetic torque converter turbine member to the transmission gear box during actual operation under road conditions. In obtaining the data in FIGURE 3, a suitable brush recorder was used and the horizontal axis of the graph represents the operating time interval. The zero voltage reference line for the graph of FIGURE 3 is shown at "A" and the voltage readings obtained by the torque meter of my instant invention are represented by the fluctuating line "B."

For the purpose of comparison, the readings obtained by my improved torque meter have been plotted adjacent the corresponding readings obtained by means of a conventional and rather costly strain gage torque meter. The zero voltage reference line for the strain gage reference meter is shown at "C." The voltage readings obtained by the strain gage torque meter are shown at "D." It is apparent from an inspection of FIGURE 3 that the readings obtained by both instruments are substantially identical and that the voltage fluctuation due to changing torque demands of the transmission follow the same pattern.

The readings obtained at the left-hand side of the graph of FIGURE 3 represent the torque on the turbine shaft when the test vehicle is standing still with the engine idling. A certain amount of frictional drag on the turbine results since the torque delivery gears are conditioned for operation although the magnitude of this torque is relatively small as is readily apparent from FIGURE 3.

The raised portion of the graph of FIGURE 3 represents the torque applied to the turbine shaft when the engine throttle is open and the vehicle is accelerating. Under these conditions the torque converter operates in a relatively high torque ratio range. When the vehicle speed increases, the torque converter torque ratio gradually decreases and the turbine shaft torque decreases accordingly. This is apparent from the negative slope obtained by lines B and D. After a certain vehicle speed is reached, an automatic upshift occurs from an intermediate speed ratio range to a direct drive or high speed.

This causes a change in torque of the turbine shaft which is due in part to the overlap between the operation of the transmission clutches and brakes. The corresponding fluctuation in lines B and D may be observed. After this shift has been completed, the torque readings continue to decrease as the vehicle speed increases further for the particular throttle setting of the vehicle engine.

The principle of my invention may also be readily applied to a conventional electrical dynamometer for the purpose of measuring the dynamometer braking torque. In this instance the windings of the dynamometer form a counterpart for the plurality of windings of coil 16 above described. The secondary windings may be formed by placing a probe or electrical pick-up on the armature bearing and by grounding the probe by means of a lead extending to the dynamometer casing. The galvanometer circuit may be disposed in series with the electrical probe. Accurate torque readings may thus be obtained in this fashion without the need for cradling the dynamometer chassis or providing a torque arm and scale mechanism.

Having thus described the principal features of my invention, what I claim and desire to secure by United States Letters Patent is:

1. In a torque meter for measuring the stress applied to a shaft having magnetic properties, a housing for receiving said shaft, bearing means in said housing for supporting said shaft, plural electrical windings disposed in the vicinity of said shaft, means for exciting said windings with an alternating current potential thereby establishing a magnetic flux field, a secondary winding including an electrical lead, means for establishing an electrical connection between said lead and said bearing means at one location on the shaft, a galvanometer, one side of said galvanometer being connected to said lead, the other side of said galvanometer being grounded to said housing at a location spaced from said bearing means, and means for grounding said shaft to said housing at another location on the shaft, variations in the stresses in said shaft intermediate said one location and said grounding means for said shaft influencing the induced voltage measurable by said galvanometer.

2. In a torque meter for measuring the stress applied to a power delivery shaft having magnetic properties, said shaft being disposed in a power transmission housing, a plurality of electrical windings disposed about said shaft, bearing means for rotatably supporting said shaft at spaced locations for rotation about its longitudinal axis, an electrical lead, means for establishing an electrical connection between said lead and said bearing means at one of said spaced locations, a galvanometer circuit, one side of said galvanometer circuit being electrically connected to said lead and the other side thereof being grounded to said housing, means for grounding said shaft to said housing adjacent the other of said locations, and means for exciting said electrical windings with an alternating current voltage.

3. In a torque meter for measuring the stress applied to a power delivery shaft having magnetic properties, a housing enclosing said shaft, a plurality of electrical windings disposed about said shaft, means for exciting said windings with an alternating current potential, bearing means in said housing for journaling said shaft at spaced locations, a galvanometer, and an electrical lead connecting one side of said galvanometer to one of said bearing means, the other side of said galvanometer being grounded, means for grounding said shaft adjacent the other of said bearing means, said lead and said shaft forming in part an electric transformer winding and the voltage induced therein being an indication of the torque delivered by said shaft.

References Cited in the file of this patent

UNITED STATES PATENTS 2,511,178   Roters _____ June 13, 1950
2,895,331   Dahle _____ July 21, 1959

OTHER REFERENCES

Reports Aeronautical Institute of Tokio University, Article 52, Application of the Inverse Wiedeman Effect to Torque Measurements and to Torque Variation Recordings, by Tatuo Kobayasi et al., pp. 425–445, November 1929. (Copy in 73–136 E.)